United States Patent [19]

Marsland

[11] Patent Number: 6,110,323
[45] Date of Patent: Aug. 29, 2000

[54] METHODS OF REFINING AGRICULTURAL RESIDUES TO ABSORBENT CELLULOSE, XYLOSE, AND PLANT NUTRIENT LIQUOR, AND PRODUCTS PRODUCED BY SUCH METHODS

[75] Inventor: Charles Marsland, Sudbury, Mass.

[73] Assignee: Betafoods Corporation, Natick, Mass.

[21] Appl. No.: 09/368,249

[22] Filed: Aug. 3, 1999

Related U.S. Application Data

[60] Provisional application No. 60/095,086, Aug. 3, 1998.

[51] Int. Cl.$^7$ .................................................. D21C 11/00
[52] U.S. Cl. ............................... 162/14; 162/16; 162/78; 162/81; 162/82; 162/90; 162/91; 162/96; 162/97; 162/99; 162/189; 127/34; 127/37
[58] Field of Search .......................... 127/37, 34; 162/81, 162/78, 82, 90, 97, 21, 23, 14, 16, 91, 96, 99, 189

[56] References Cited

U.S. PATENT DOCUMENTS 4,957,599  9/1990  Chou et al. ............................... 162/78

*Primary Examiner*—Peter Chin
*Assistant Examiner*—Mark Halpern
*Attorney, Agent, or Firm*—Nields, Lemack & Dingman; Brian M. Dingman

[57] ABSTRACT

A method of creating a number of separate product streams from an agricultural waste material, comprising: providing a starting material consisting of an agricultural waste material; hydrolyzing the starting material with an acid solution at atmospheric pressure, and temperatures not exceeding about 100° C., to create an absorbent, hydrolyzed solid residue and a xylose-containing liquor; reserving the xylose-containing liquor; and delignifying the hydrolyzed solid residue with a basic solution, to create a fiber solid residue suitable for use as an absorbent material, and a dissolved lignin-containing solution.

19 Claims, No Drawings

METHODS OF REFINING AGRICULTURAL RESIDUES TO ABSORBENT CELLULOSE, XYLOSE, AND PLANT NUTRIENT LIQUOR, AND PRODUCTS PRODUCED BY SUCH METHODS

CROSS REFERENCE TO RELATED APPLICATION

This application is a continuation in part of Provisional application 60/095,086, filed on Aug. 3, 1998. Priority is claimed.

FIELD OF THE INVENTION

This invention relates to methods of refining agricultural residues to absorbent cellulose, xylose, and plant nutrients, and the products resulting from such processes.

BACKGROUND OF THE INVENTION

Xylose is currently produce at temperatures over 130° C. and elevated pressure, making the production process relatively expensive.

Delignification of lignocellulosic materials typically is accomplished using sulfur-containing materials or gases at high temperature and pressure. Bleaching of cellulose typically takes place in multi-stage processes utilizing ozone, oxygen, and harsh oxidizers at above atmospheric pressures. Cellulose production is thus expensive as well. There is thus a great need for an economic process utilizing agricultural waste materials to create xylose and cellulose (e.g., high crude fiber), at atmospheric pressures and temperatures below 100° C.

SUMMARY OF THE INVENTION

This invention relates generally to methods of processing agricultural waste materials such as straw, hulls, corn stover and corn cobs, to economically produce absorbent cellulose, including high crude fiber, xylose, and a plant nutrient including at least two of the primary plant nutrients. The processes take place at atmospheric pressure, and temperatures below 100° C., so that the resulting products are produced at relatively low cost. Also, little water is used in the processing, resulting in low volume waste streams, which is good for the environment, and also keeps production costs to a minimum.

This invention features processes for producing various product streams from agricultural lignocellulosic materials. Most basically, this invention contemplates using an agriculturally-derived lignocellulosic material as the starting material. Examples of such materials include, but are not limited to, agricultural waste materials such as oat hulls, wheat straw, corn stover, corn cobs, barley hulls, rye straw, and peanut shells. Other agriculturally-derived lignocellulosic materials could also be used. Such are preferred, for these waste materials are generally available at relatively low cost, wherever such crops are grown and harvested, and currently have no commercial material use.

The invention consists generally of the following process: acid hydrolysis of the starting material(s), followed by delignification of the remaining solids at basic conditions. Both steps may take place at atmospheric pressure, and temperatures below boiling, which greatly simplifies the process and process equipment needs, as compared to prior art processes for producing xylose and cellulose. The delignified solids are then preferably bleached. Bleaching can be accomplished in standard fashion, for example using hydrogen peroxide, oxygen, ozone, chlorine dioxide, hypochlorite, alkaline peroxide, alkaline urea peroxide, and combinations thereof.

The acid hydrolysis step dissolves the hemicellulose, xylose, and monosaccharides. This step thus yields a saccharide-containing liquor which includes xylose, itself a useful product. The xylose-containing liquor can be purified by means of pH adjustment, color removal using traditional absorbents such as activated carbon, ion exchange, and evaporation and crystallization, if desired. The xylose can also be hydrogenated to produce xylitol. The xylose can also be used as a fermentation medium.

The solid residue of the acid hydrolysis step contains primarily lignin and cellulose. This residue is delignified, and the remaining solids have a high crude fiber and total dietary fiber content, and low ash content, making such solids suitable for use in animal feeds and in human foods. The delignification step also yields dissolved lignin, which can be used as a plant fertilizer product, particularly when combined with one or more of nitrogen, potassium and/or phosphorus-containing compounds, which themselves can be advantageously introduced in the delignification step.

In the preferred embodiments, the hydrolysis is carried out with a mineral acid such as sulfuric acid, at a pH of between 0 and 3, at atmospheric pressure, temperatures of 70 to just under 100° C., for approximately 3.5 hours, with agitation. The product is filtered and can be washed if desired. A complexing agent may be used in the wash, to remove metals which can interfere with the later bleaching step when hydrogen peroxide is used. Any suitable complexing agent, such as EDTA, HEDTA, DEDTA, citric acid, carboxylic-functionalized lignins, or other traditional chelates may be used.

The alkaline digestion is preferably accomplished using a metal or ammonium hydroxide solution, at a pH of between 11 and 14, temperatures of below boiling, for up to about 3.5 hours, with agitation. Urea, which swells the solids, can be added during this step. The swelling increases the effectiveness of the delignification. The dissolved lignin is an effective soil amendment. Advantageously, using KOH and urea in the delignification creates a dissolved lignin-containing liquor which also contains nitrogen and potassium, two of the three most important fertilizer substances. The lignin-containing liquor may thus be utilized as a plant fertilizer/soil amendment.

DESCRIPTION OF THE PREFERRED EMBODIMENTS

This invention features processes for producing various product streams from agricultural lignocellulosic materials. Most basically, this invention contemplates using an agriculturally-derived lignocellulosic material as the starting material. Examples of such materials include, but are not limited to, agricultural waste materials such as oat hulls, wheat straw, corn stover, corn cobs, barley hulls, rye straw, and peanut shells. Other agriculturally-derived lignocellulosic materials could also be used. Such are preferred because they are annual crops (thus renewable), are currently considered waste materials, are generally available at relatively low cost (wherever such crops are grown and harvested), and produce a number of products of great commercial value as compared to wood derived materials.

The invention consists generally of the following process: acid hydrolysis of the starting material(s), followed by delignification of the remaining solids at basic conditions. Both steps may take place at atmospheric pressure, and temperatures below boiling, which greatly simplifies the process and process equipment needs, as compared to prior art processes for producing xylose and cellulose. The delignified solids can be bleached, if a whiter product is desired. Bleaching can be accomplished in standard fashion, for example using hydrogen peroxide, oxygen, ozone, chlorine dioxide, hypochlorite, alkaline peroxide, alkaline urea peroxide (the preferred bleaching combination), and combinations thereof.

The following examples illustrate the inventive processes, and the resulting products.

EXAMPLE 1

638 grams of oat hulls (containing 6% moisture) were hydrolyzed by mixing them with 39.3 ml of 95.5% sulfuric acid in 2.4 liters of distilled water (distilled water was used in all of the steps of all examples), at a temperature of 80–90° C., with agitation, for approximately 3.5 hours, including heat up time from room temperature. This same oat hulls material was used in all of the below examples, except where noted. The mixture was then vacuum filtered in a Buchner funnel with a 20 mesh screen. This same filtration setup was used in all filtration steps in all of the examples herein, except where noted.

The solid residue was transferred for delignification to a jacketed vessel, to which was added 1.75 l distilled water, and 150 g anhydrous potassium hydroxide. The mixture was heated with stirring to about 80–90° C., vacuum filtered again with the same filtration setup, and rinsed twice by mixing each time with 2 l distilled water, and vacuum filtering. In the final rinse, the mixture was adjusted to pH 7 using phosphoric acid.

The resulting product, in a yield of 36% by weight of the starting material, had a crude fiber content (measured using the AACC method 32-10) of 84.9%, and a water absorption of 421%.

EXAMPLE 2

The hydrolysis and delignification was identical to that in example 1, except 3 liters of water was used in the hydrolysis rather than 2.41. The yield post delignification was measured to be 38%. 195.76 g of the moist delignified solid residue was bleached by sealing it in a bag with 210 ml water, 3.9 ml of 35% hydrogen peroxide, and enough KOH to raise the pH above 11.2, and placing the bag in a 70° C. water bath for 1 hour. The residue was rinsed and pH adjusted as in example 1.

The resulting product, in a yield of 34%, had a crude fiber content of 85.2%, and a water absorption of 470%.

EXAMPLE 3

The hydrolysis and delignification were identical to example 2, except that 15 g of urea was also added in the delignification step, which yielded 38.5%. 183.24 g of the damp residue was bleached in the same manner as in example 2, except 5.8 ml of hydrogen peroxide was used, and also 5.8 ml of a 3.5% urea solution was added to the bag. A second bleaching was performed by opening the bag and adding to it the same amount again of hydrogen peroxide, urea, and potassium hydroxide, and repeating the warm water bath immersion.

The resulting product, in a yield of 33%, had a crude fiber content of 89.6%, a water absorption of 866%, 0.60% ash, and 2,027 PPM potassium.

EXAMPLE 4

The acid hydrolysis was identical to that of example 3, except that the starting material was 660 g of the same oat hulls, but milled first to an average particle size of less than about 550 microns. The yield from the hydrolysis step was measured to be 61%.

241.78 g of the damp hydrolysis residue was placed in a bag with 67.5 ml of 40% KOH, and 142.5 ml water. The bag was immersed in a 90° C. water bath for 2 hours, and filtered and rinsed twice, yielding 32% solids. 174.75 g of these solids were bleached by placing them in a bag along with 150 ml water, and 60 ml of 15% sodium hypochlorite, and immersed in a 45° C. water bath for 1.5 hours. The residue was bleached a second time by filtering it, and placing it in a bag with 210 ml water, 7.7 ml of 35% hydrogen peroxide, and 12 ml of 40% KOH, to raise the pH above 11.2. The bag was immersed in an 80° C. water bath for 1 hour, and filtered, rinsed, and pH adjusted as above.

The resulting product, in a yield of 27%, had a crude fiber content of 88.3%, 5% lignin, 0.94% ash, and a water absorption of 613%.

EXAMPLE 5

The hydrolysis and delignification was identical to example 4, except 234.6 g of residue was delignified, rather than 241.78 g. Also, the final rinse after the delignification included 3 ml of 5% EDTA added to the rinse water.

The bleaching consisted of placing the solid residue into a bag, along with 4 ml of 40% sodium hydroxide, 5.8 ml of 35% hydrogen peroxide, and 200 ml water, and immersing in an 80° C. water bath for 1 hour, followed by two rinses. This identical bleaching was repeated, and the resulting solids pH adjusted with hydrochloric acid to a pH of 7.4, and then milled to a size of less than about 450 microns.

The resulting solids had a crude fiber of 87.51%, total dietary fiber (measured by the AACC method 32-05) of 99.9%, 0.31% ash, a water absorbency of 784%, and a bulk density of 7.7 pounds per cubic foot.

EXAMPLE 6

The hydrolysis and delignification were identical to example 1, except 12 ml of 5% EDTA was added to the second post-delignification rinse. The resulting residue, in a yield of 37%, was bleached by adding 189.1 g to a bag along with 210 ml water, 5.8 ml of 35% hydrogen peroxide, 5.8 ml of 3.5% urea, and 4 ml of 80% KOH, with 1 hour of 70° C. immersion. The bag was opened, and the same amounts of urea and hydrogen peroxide were added, along with 6 ml of the KOH solution, and again immersed at 70° C. for 1 hour.

The resulting product, in a yield of 35%, had a crude fiber content of 85.9%, 0.66% ash, 6.8% lignin, and a water absorbency of 460%.

EXAMPLE 7

The hydrolysis and delignification was identical to that of example 3, except the hydrolysis proceeded at a temperature of 75–84° C., and 75 g, rather than 15 g, of urea was used in the delignification, which proceeded for only 1 hour. 3 ml of 5% EDTA was added to the second post-delignification rinse. The resulting residue was adjusted to pH 7 with phosphoric acid.

The resulting product had a crude fiber of 83.5%, 2.0% ash, 5.56% lignin, less than 0.3% urea, and a water absorbency of 513%.

EXAMPLE 8

The hydrolysis was identical to example 7, as was the delignification, except that it proceeded for 3 hours, and 6 ml of the EDTA was added to the second rinse. The pH was adjusted to 6 rather than 7.

The resulting product had a crude fiber of 95.3%, 5.94% ash, 7.64% lignin, and less than 0.3% urea, and a water absorbency of 464%.

EXAMPLE 9

The hydrolysis was identical to example 7, except that the temperature was 75–90° C. The delignification was accomplished by placing one fourth of the solid residue into a bag along with 67.6 ml of 40% NaOH, and 142.5 ml water, and immersing it in a 90° C. water bath for 2 hours. The two rinses each used 500 ml water with 3 ml of 5% EDTA added. The pH was adjusted to 7.4 using HCl.

The resulting product had a crude fiber content of 83.67%.

EXAMPLE 10

The hydrolysis was identical to that of example 4, except the oat hulls were not milled. Yield was 37%. The delignification proceeded as in example 1, except that 12 ml of the 5% EDTA was used in the second rinse.

189.1 g of the delignification residue was then bleached in a bag along with 210 ml water, 3.9 ml of the 35% hydrogen peroxide, 3.9 ml of the 3.5% urea, and 2.5 ml of the 40% KOH, and immersed in a 70° C. water bath for 1 hour. The solids were filtered and rinsed, and the pH adjusted to 7 with phosphoric acid.

The resulting product had a crude fiber content of 85.1%, a lignin content of 7.21%, 0.62% ash, and a water absorbency of 459%.

EXAMPLE 11

The hydrolysis was identical to that of example 10. For delignification, 258 g of the hydrolysis residue was added to 500 ml of 90° C. water, along with 37.5 g anhydrous KOH, and maintained with stirring at 900° C. for 15 minutes, followed by two rinses with 500 ml water including 4 ml of the 5% EDTA solution. pH was adjusted to 6.5 with hydrochloric acid.

The resulting product had a crude fiber content of 75.16%.

EXAMPLE 12

The process was identical to that of example 11, except that 3.7 g of urea was added in the delignification mixture, which proceeded for 30 minutes rather than 15.

The resulting product had a crude fiber content of 78.45%.

EXAMPLE 13

The hydrolysis proceeded as in Example 2. The hydrolysis liquor was removed and reserved. Delignification of 250 g of the solid residue was accomplished by adding it to 500 ml water along with 18.75 g urea, and 37.5 g anhydrous KOH, and placing the beaker in an ice bath, with agitation of the beaker contents, for 2 hours. The solids were then filtered and rinsed two times with 500 ml water, with 3.2 ml of the 5% EDTA solution added to the second rinse. pH was adjusted to 7 with phosphoric acid.

The resulting product had a crude fiber content of 69.2%.

The hydrolysis liquor was further treated as follows. The pH of the filtrate posthydrolysis was adjusted to pH 7 using calcium hydroxide. Activated carbon was then added, and the mixture was stirred on a hot plate at 65° C. for 30 minutes, and filtered. The liquor was then subjected to sequential cation and then anion exchange by adding the appropriate resin to the liquor, stirring for 5–15 minutes, and filtering. The liquor was then concentrated under a rotovap, resulting in a high viscosity solution with a light strawberry to clear color.

EXAMPLE 14

A wheat straw sample was processed as follows. 270 g of milled wheat straw was hydrolyzed as in example 1, except only 20 ml of the sulfuric acid was used. The hydrolysis liquor was removed and reserved. Delignification was accomplished by adding to the hydrolysis residue 1362 ml water, 15 g urea, and 155 g anhydrous KOH, which was maintained at 80–90° C., with stirring, for 2 hours. A double 500 ml rinse was performed, with 3.2 ml of the 5% EDTA added to the second rinse.

Bleaching was accomplished on the solid residue by adding to it 14 ml of the 35% hydrogen peroxide, 700 ml water, 1.4 ml urea, and the pH adjusted to 11.5 using a sodium hydroxide solution. The mixture was stirred and held at 80–85° C. for 1 hour. After filtration and rinsing, the solids were bleached again using 20 ml of sodium hypochlorite and 700 ml water, at 80–85° C., with stirring, for 1 hour. After filtration and rinsing, the pH was adjusted to 7 with phosphoric acid.

The resulting product had a crude fiber of 81.6%, total dietary fiber of 94.8%, 2.41% ash, and a water absorbency of 1,026%.

The hydrolysis liquor was processed as in example 13, with the same results.

EXAMPLE 15

The hydrolysis and delignification were identical to Example 3, except that 12 ml of 5% EDTA was added to each of the two rinses post-delignification. The bleaching was accomplished by adding to the damp solids post-delignification 2.25 l water, 12 ml 80% KOH, 23.2 ml hydrogen peroxide, and 23.2 ml 3.5% urea, into a 4 l vessel, with stirring, held at about 70° C. for 1 hour. After the hour, 23.2 ml of the 35% hydrogen peroxide was added, along with 17.5 ml of the 80% KOH, with agitation. The pH was adjusted to 7 with phosphoric acid, and the solids were filtered and rinsed.

The resulting product had a total dietary fiber content of 99.6%, crude fiber of 88.9%, 0.66% ash, and had a water absorption of 1030%.

EXAMPLE 16

330 g of the hydrolyzed oat hulls from example 1 were placed in a beaker along with 600 ml water, 60 g urea, and agitated at 80–85° C. 50 g of KOH were added in the first 10 minutes, then the beaker was covered for 3 hours. After filtration and two rinses, the solids had added to them 500 ml water and 60 ml of 35% sodium hypochlorite, and held at 45° C. for 1.25 hours, filtered and rinsed.

The solids were bleached by adding to them 650 ml water, 14 ml 35% hydrogen peroxide, and 13 ml of 3.5% urea, and stirring at 80° C. for 1.5 hours, after which the solution was neutralized with 6 ml phosphoric acid, rinsed and filtered.

The resulting product had an alpha cellulose content of 81.3%.

EXAMPLE 17

103 g of partially milled wheat straw was placed in a beaker along with 1 l water and 15 ml sulfuric acid, and stirred for three hours at about 85–90° C. After filtration, the solids were placed in a beaker along with 1.5 l water and 50 g KOH, and stirred at 85–90° C. for 2.25 hours. After filtration, the solids were rinsed with water containing 3 ml EDTA, and filtered again.

Bleaching was accomplished by placing the solid residue in a beaker along with 1 l water and 8 ml hydrogen peroxide, and stirring for 1 hour at 80–90° C., followed by filtration. The solids were then placed in a bag to which was added 50 ml sodium hypochlorite and 600 ml water. The bag was sealed and placed in a 45° C. water bath for 1.5 hours. After filtration, the solids were placed in a beaker along with 600 ml water, 10 ml hydrogen peroxide, 11 ml of 3.5% urea, and 4 g sodium hydroxide, to bring the pH up to about 12. The mixture was stirred at 80–90° C. for 1.5 hours, rinsed and filtered.

The resulting product had an alpha cellulose content of 84.0%.

EXAMPLE 18

155 g of corn stalks (corn stover) in pieces from about 1–10 inches long were placed in a beaker along with 1950 g water and 11 ml sulfuric acid. The beaker was placed in a 90–95° C. water bath and agitated for 2 hours and 50 minutes, including heat-up time. After filtration, the solids were placed in a beaker along with 2 l water, 60 g KOH, and 12 g urea, and heated to 90–95° C. and stirred for 2 hours including heat up.

After filtration, the solids were placed in a beaker along with 1.2 l water and 18 ml hydrogen peroxide, and heated to 75–80° C. with stirring for 1 hour. After filtration, the solids were sealed in a bag along with 800 ml water and 60 ml sodium hypochlorite, and placed in a 45° C. water bath for 1 hour. After filtration, the solids were placed in a beaker along with 1.3 l water, and 16 ml hydrogen peroxide, and stirred at 75–80° C. for 1.5 hours, followed by neutralization with phosphoric acid, filtration and rinsing, The resulting product had an alpha cellulose content of 81%

EXAMPLE 19

300 grams of partially milled wheat straw was added to 2.3 l water, to which was added 20 ml sulfuric acid, and heated with stirring to between 85 and 90° C. for 3½ hours. After filtration, the solids residue weighed 881.3 g (132.18 g dry weight)

The wet solids were transferred back to the kettle, and to this was added 78.3 g potassium hydroxide, 8.3 g urea, and 1.7 l water. The pH was 13.33. This was heated with stirring for 4 hours (including heat up time) at about 90° C. The solids were then removed by vacuum filtration and rinsed. The solids were then treated with a mixture of water and 6 ml EDTA and let stand for a few minutes before vacuum filtration again.

The solids were then transferred back to the kettle, to which was added 1.85 l water, 20.5 ml of 35% hydrogen peroxide, 10 g sodium hydroxide, and 4 g urea. After 1 hour under stirring at 90° C., 15 ml hydrogen peroxide and 8 g sodium hydroxide were added, and the mixture was left with stirring at about 85–90° C. for another 50 minutes. 24.5 ml of phosphoric acid and 150 ml water were then added and allowed to mix for 15 minutes, bringing the pH to 7.55. The resulting bleached fiber was then dried to a 10% moisture content and milled to less than 150 microns. The milled product had a water absorption capacity of about 1400%.

Each of the above features of the invention may be combined within the scope of the invention as understood by those skilled in the art. Other embodiments will occur to those skilled in the art and are within the scope of the following claims.

What is claimed is:

1. A method of creating a number of separate product streams from an agricultural waste material, comprising:

providing a starting material consisting of an agricultural waste material;

hydrolyzing said starting material with an acid solution at atmospheric pressure, and temperatures not exceeding about 100° C., to create an absorbent, hydrolyzed solid residue and a xylose-containing liquor;

reserving said xylose-containing liquor; and delignifying said hydrolyzed solid residue with a basic solution with urea, to create a highly absorbent fiber residue suitable for use as an absorbent material, and a dissolved lignin-containing solution.

2. The method of claim 1 in which said hydrolysis step takes place with a mineral acid.

3. The method of claim 2 in which said mineral acid comprises sulfuric acid.

4. The method of claim 2 in which said hydrolysis step takes place at a pH between about 0 and about 3, at a temperature of at least about 70° C.

5. The method of claim 1 further including the step of washing said hydrolyzed solid residue with a water wash including a complexing agent, to remove metals.

6. The method of claim 1 in which said delignification step takes place with an hydroxide solution.

7. The method of claim 6 in which said delignification step takes place at a pH of between about 11 and about 14, at a temperature not exceeding about 100° C. and at atmospheric pressure.

8. The method of claim 1 in which said hydroxide solution includes potassium hydroxide.

9. The method of claim 1 further including reserving said lignin-containing solution for use as a plant nutrient including both potassium and nitrogen.

10. The method of claim 1 further including bleaching said high crude fiber solid residue in at least one bleaching step to create a bleached solid residue.

11. The method of claim 10 in which said bleaching step uses a water solution of a bleaching agent.

12. The method of claim 11 in which said bleaching step also uses urea.

13. The method of claim 11 in which said bleaching step takes place at atmospheric pressure, basic pH, and elevated temperature of no more than about 100° C.

14. The method of claim 12, further including adding phosphoric acid during said bleaching step.

15. The xylose-containing liquor produced by the method of claim 1.

16. The dissolved lignin-containing solution produced by the method of claim 1.

17. The fiber solid residue produced by the method of claim 1.

18. The bleached solid residue produced by the method of claim 14, having a water absorption capacity of at least about 1000%.

19. The method of claim 1 in which said starting material is selected from the group of materials consisting of grain hulls, straws, and corn plant materials.

* * * * *